United States Patent
Li et al.

(10) Patent No.: US 11,362,482 B2
(45) Date of Patent: Jun. 14, 2022

(54) INTEGRATED FOURIER DOMAIN MODE-LOCKED OPTOELECTRONIC OSCILLATOR, APPLICATION AND COMMUNICATION SYSTEM

(71) Applicant: INSTITUTE OF SEMICONDUCTORS, CHINESE ACADEMY OF SCIENCES, Beijing (CN)

(72) Inventors: Ming Li, Beijing (CN); Tengfei Hao, Beijing (CN); Dapeng Liu, Beijing (CN); Nuannuan Shi, Beijing (CN); Wei Li, Beijing (CN); Ninghua Zhu, Beijing (CN)

(73) Assignee: Institute of Semiconductors, Chinese Academy of Sciences, Beijing (CN)

( * ) Notice: Subject to any disclaimer, the term of this patent is extended or adjusted under 35 U.S.C. 154(b) by 53 days.

(21) Appl. No.: 16/871,990

(22) Filed: May 11, 2020

(65) Prior Publication Data
US 2020/0358244 A1 Nov. 12, 2020

(30) Foreign Application Priority Data
May 10, 2019 (CN) .......................... 201910391724.6

(51) Int. Cl.
*H01S 3/11* (2006.01)
*G02F 1/01* (2006.01)
(Continued)

(52) U.S. Cl.
CPC .......... *H01S 3/1106* (2013.01); *G02F 1/0123* (2013.01); *H01S 3/06791* (2013.01); *H01S 3/302* (2013.01)

(58) Field of Classification Search
CPC .... H01S 3/1106; H01S 3/06791; H01S 3/302; H01S 3/0078; H01S 3/30; H01S 3/0085; H01S 1/02; G02F 1/0123
See application file for complete search history.

(56) References Cited

U.S. PATENT DOCUMENTS

| | | | | |
|---|---|---|---|---|
| 2002/0179919 A1* | 12/2002 | Deisenhofer | ......... | H01L 33/486 257/99 |
| 2005/0123306 A1* | 6/2005 | Ilchenko | ............ | G02B 6/29395 398/161 |
| 2006/0244973 A1* | 11/2006 | Yun | ..................... | G01B 9/02091 356/511 |

FOREIGN PATENT DOCUMENTS

CN 105576478 A 5/2016
CN 107069390 A 8/2017
(Continued)

OTHER PUBLICATIONS

Chi H. Lee, *Microwave Photonics*, 2nd ed., CRC Press, Beijing, 2017, p. 131-133.
(Continued)

*Primary Examiner* — Xinning (Tom) Niu
(74) *Attorney, Agent, or Firm* — Seed IP Law Group LLP

(57) ABSTRACT

An integrated Fourier domain mode-locked optoelectronic oscillator and its application and a communication system are provided, which relates to the technical field of microwave photonics. The integrated Fourier domain mode-locked optoelectronic oscillator includes an optoelectronic chip and an electronic chip. The optoelectronic chip includes a laser, a modulator, an optical notch filter, and a photodetector coupled via an optical waveguide. The electronic chip includes an electrical amplifier and a power splitter coupled via a coplanar microwave waveguide. The volume, weight and power consumption of the Fourier domain mode-locked optoelectronic oscillator is greatly reduced by integrating all
(Continued)

the devices on the chip. A tunable sweeping microwave signal output is realized, and the sweeping speed of the output signal is increased. The integrated Fourier domain mode-locked optoelectronic oscillator can be used in radars and communication systems.

13 Claims, 1 Drawing Sheet

(51) Int. Cl.
*H01S 3/067* (2006.01)
*H01S 3/30* (2006.01)

(56) References Cited

FOREIGN PATENT DOCUMENTS

| CN | 108183380 A | 6/2018 |
|----|-------------|--------|
| CN | 109687259 A | 4/2019 |
| CN | 110137778 A | 8/2019 |
| CN | 110504613 A | 11/2019 |
| CN | 110707509 A | 1/2020 |
| CN | 110707510 A | 1/2020 |
| CN | 110707511 A | 1/2020 |

OTHER PUBLICATIONS

Hao et al., "Breaking the Limitation of Mode Building Time in an Optoelectronic Oscillator," Nature Communications. 9:1839, 2018.
Hao et al., "Tunable Fourier Domain Mode-Locked Optoelectronic Oscillator Using Stimulated Brillouin Scattering," IEEE Photonics Technology Letters, vol. 30, No. 21, 2018.
Hao et al., "Fourier Domain Mode Locked Optoelectronic Oscillator Based On The Deamplification Of Stimulated Brillouin Scattering," OSA Continuum, vol. 1, No. 2, 2018.
Hao et al., "Harmonically Fourier Domain Mode-Locked Optoelectronic Oscillator," IEEE Photonics Technology Letters, vol. 31, No. 6, 2019.
Hao et al. "Dual-Chirp Fourier Domain Mode-Locked Optoelectronic Oscillator," Optical Society Of America, vol. 44, No. 8, 2019.

\* cited by examiner

INTEGRATED FOURIER DOMAIN MODE-LOCKED OPTOELECTRONIC OSCILLATOR, APPLICATION AND COMMUNICATION SYSTEM

CROSS-REFERENCE TO RELATED APPLICATION(S)

This application claims priority to the Chinese Patent Application No. 201910391724.6, filed on May 10, 2019, entitled "INTEGRATED FOURIER DOMAIN MODE-LOCKED OPTOELECTRONIC OSCILLATOR, APPLICATION AND COMMUNICATION SYSTEM" which is incorporated herein by reference in its entirety.

TECHNICAL FIELD

The present disclosure relates to the technical field of microwave photonics, and more particularly to an integrated Fourier domain mode-locked optoelectronic oscillator, which can be used as a small-size integrated microwave photonic signal source to generate a sweep microwave signal with an adjustable frequency broadband, and application thereof and a communication system including the same.

BACKGROUND

An optoelectronic oscillator is an opto-electronic hybrid self-exciting oscillation loop, which can generate microwave signals with extremely low phase noise by means of a resonant cavity with an ultra-high quality factor, and thus is an ideal microwave signal source for radars, modern instruments and communication networks. A typical optoelectronic oscillator system mainly includes core devices such as a laser, an electro-optic modulator, a latency unit, an optical amplifier, a photodetector, and an electrical amplifier. These devices constitute a closed loop feedback system, which may generate microwave signals by self-excited oscillation when the gain is greater than the loss in the loop. However, most of the existing optoelectronic oscillator systems are composed of discrete devices, causing their performance being inferior to those of electronic devices in terms of volume, power consumption, stability, and cost. Therefore, an integrated optoelectronic oscillator is one of the keys to improve their competitiveness. With a development of the integrated optoelectronic technology, it is possible to provide necessary conditions for implementing the integrated optoelectronic oscillator.

In addition, traditional optoelectronic oscillators can only generate single-frequency microwave signals by self-excited oscillation, but cannot generate sweeping microwave signals, since when the traditional optoelectronic oscillators attempt to perform a sweeping operation, a brand new mode is required to be established from noise again by oscillation, which requires a certain time for mode establishment. Therefore, the traditional optoelectronic oscillators are not able to generate continuous sweeping signals. Recently, we have proposed an approach to enable the optoelectronic oscillator to generate sweeping microwave signals by utilizing the Fourier domain mode-locking technology. In particular, by adding a sweeping filter into the optoelectronic oscillator, and synchronizing the sweeping period of the filter with the latency of the optoelectronic oscillator loop, the limitation of mode establishment time in the traditional optoelectronic oscillators may be broke through. However, the present Fourier domain mode-locked optoelectronic oscillators are still built based on discrete devices, thus their sizes and power consumptions are relatively large.

SUMMARY

In view of this, the present disclosure is directed to provide an integrated Fourier domain mode-locked optoelectronic oscillator and an application thereof, and a communication system including the same, thereby at least partially solving at least one of the technical problems mentioned above.

According to a first aspect of the present disclosure, there is proposed an integrated Fourier domain mode-locked optoelectronic oscillator, including an optoelectronic chip and an electronic chip, wherein:

the optoelectronic chip includes a laser, a modulator, an optical notch filter, and a photodetector coupled via an optical waveguide, wherein:

the laser is configured to generate an optical signal;

the modulator is configured to perform a phase modulation on the optical signal, so as to generate an optical signal carrier and upper and lower sidebands;

the optical notch filter is configured to filter out one of the sidebands generated by the phase modulation, so as to obtain an equivalent intensity modulated optical signal;

the photodetector is configured to detect and convert the equivalent intensity modulated optical signal into an electrical signal;

wherein the laser, the modulator, the optical notch filter, and the photodetector constitute a microwave photonic filter which is based on phase modulation and phase modulation to intensity modulation conversion, and the microwave photonic filter is configured to sweep a passband by changing an emission wavelength of the laser or a filtering position of the optical notch filter periodically;

the electronic chip includes an electrical amplifier and a power splitter coupled via a coplanar microwave waveguide, wherein:

the electrical amplifier is configured to amplify the electrical signal detected by the photodetector; and the power splitter is configured to split the electrical signal after being amplified into two signals, one being output as a sweeping microwave signal, and the other being fed back to the modulator, forming a optoelectronic oscillator loop.

According to a second aspect of the present disclosure, there is also provided an application of the integrated Fourier domain mode-locked optoelectronic oscillator in a radar or communication system.

According to a third aspect of the present disclosure, there is also provided a communication system including the above-mentioned integrated Fourier domain mode-locked optoelectronic oscillator, which is used as a sweeping microwave signal source.

Compared with the prior art, the present disclosure has following beneficial effects:

(1) All of the devices required for the Fourier domain mode-locked optoelectronic oscillator provided by the present disclosure are integrated on a chip, which greatly reduces its volume, weight and power consumption. The change of the passband of the microwave photonic filter is controlled by changing the emission wavelength of the laser or the filtering position of the optical notch filter, thereby realizing a tunable sweeping microwave signal output. In addition, the Fourier domain mode-locked optoelectronic oscillator provided by the present disclosure has a shorter loop length. Further, since the sweeping speed of the output sweeping signal is synchronized with the latency for delivering a signal in the optoelectronic oscillator loop for one trip, the sweeping speed of the output signal may be increased by integration.

(2) The integrated Fourier domain mode-locked optoelectronic oscillator proposed by the present disclosure, as an integrated sweeping microwave signal source, may be an ideal microwave signal source for radars or communication systems, and has a small size, a low power consumption and a low cost.

(3) The communication system provided by the present disclosure may include an ideal microwave signal source, and may have a greatly improved communication quality, a small size, a low power consumption and a low cost.

DESCRIPTION OF REFERENCE SIGNS

Figure 1:
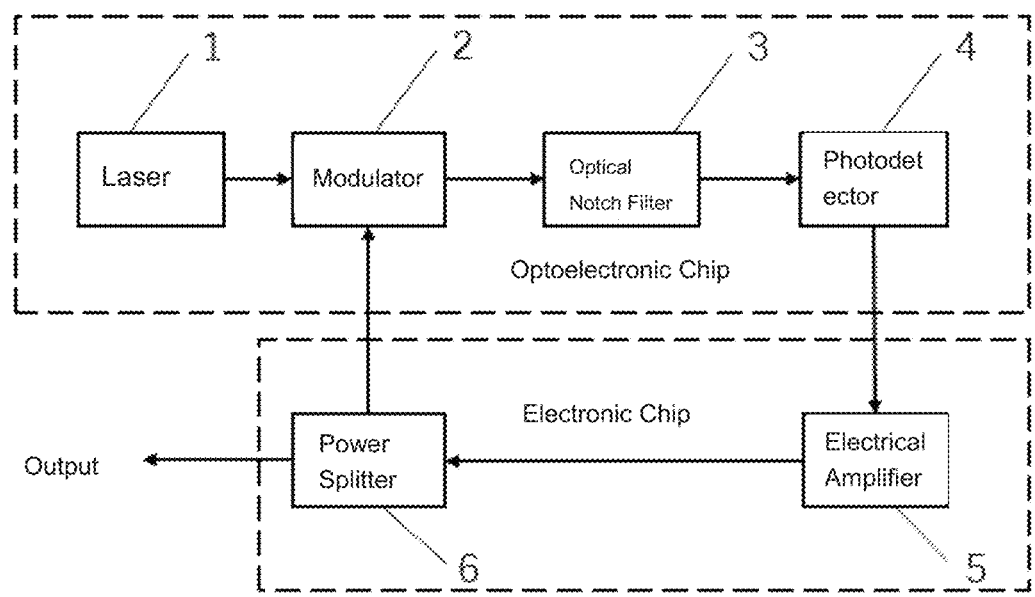
FIG. 1 is a schematic structural diagram of an integrated Fourier domain mode-locked optoelectronic oscillator according to an embodiment of the present disclosure.

In the drawings: 1—laser; 2—phase modulator 3—optical notch filter 4—photodetector; 5—electrical amplifier; 6—power splitter.

DETAILED DESCRIPTION

In order to make the objectives, technical solutions and advantages of the present disclosure clearer and more obvious, the present disclosure is described in further detail below with reference to the accompanying figures in connection with specific embodiments.

In order to improve a stability of a Fourier domain mode-locked optoelectronic oscillator and reduce its volume, power consumption and cost, the present disclosure proposes an integrated Fourier domain mode-locked optoelectronic oscillator which is configured as an integrated sweeping microwave signal source. The integrated Fourier domain mode-locked optoelectronic oscillator can be used, for example, in radars and communication systems.

As shown in FIG. 1, according to some embodiments of the present disclosure, there is provided an integrated Fourier domain mode-locked optoelectronic oscillator, including an optoelectronic chip and an electronic chip. The optoelectronic chip includes a laser 1, a modulator, an optical notch filter 3, and a photodetector 4 coupled via an optical waveguide. The electronic chip includes an electrical amplifier 5 and a power splitter 6 coupled via a coplanar microwave waveguide.

The laser 1 is configured to generate an optical signal.

The modulator is configured to perform a phase modulation on the optical signal, so as to generate an optical signal carrier and upper and lower sidebands.

The optical notch filter 3 is configured to filter out one of the sidebands generated by the phase modulation, so as to obtain an equivalent intensity modulated optical signal.

The photodetector 4 is configured to detect the equivalent intensity modulated optical signal and convert it into an electrical signal.

The electrical amplifier 5 is coupled to the photodetector 4 and configured to amplify the electrical signal from the photodetector.

The power splitter 6 is coupled to the modulator and configured to split the electrical signal after being amplified into two signals, one being output as a sweeping microwave signal, and the other being fed back to the modulator, forming a optoelectronic oscillator loop.

The laser 1, the modulator, the optical notch filter 3, and the photodetector 4 constitute a microwave photonic filter which is based on phase modulation and phase modulation to intensity modulation conversion. The passband of the microwave photonic filter can be tuned rapidly and periodically by changing an emission wavelength of the laser 1 or a filtering position of the optical notch filter 3 periodically, thereby realizing the sweeping of the microwave photonic filter The change period (i.e., sweeping period) for the passband of the microwave photonic filter is matched with a latency for delivering a signal in the optoelectronic oscillator loop for one trip, so as to satisfy the Fourier domain mode-locked condition may be satisfied:

$nT=T_r;$ wherein, n is a positive integer, T is the change period of the passband of the microwave photonic filter, and $T_r$ is the latency for delivering a signal in the optoelectronic oscillator loop for one trip.

In the Fourier domain mode-locked optoelectronic oscillator provided by the present disclosure, the laser 1, the modulator, the optical notch filter 3, and the photodetector 4 are coupled with each other via the optical waveguide, and are integrated onto the optoelectronic chip. The photodetector 4, the electrical amplifier 5, the power splitter 6, and the modulator are coupled with each other via the coplanar microwave waveguide, and the electrical amplifier 5 and the power splitter 6 are integrated onto the electronic chip. That is, the required optoelectronic devices and microwave devices are integrated onto the chips, which may greatly reduce its volume, weight and power consumption. The change of the passband of the microwave photonic filter may be controlled by changing the emission wavelength of the laser 1 or the filtering position of the optical notch filter 3, thereby realizing a tunable sweeping microwave signal output. It may have a shorter loop length, and since the sweeping speed of the output sweeping signal is synchronized with the latency for delivering a signal in the optoelectronic oscillator loop for one trip, the sweeping speed of the output signal is increased by integration. Accordingly, he integrated Fourier domain mode-locked optoelectronic oscillator proposed by the present disclosure can be used as an integrated sweeping microwave signal source with an adjustable broadband, which may generate fast chirped microwave signals with a tunable broadband, and can be applied in radars and communication systems.

In other embodiments, the modulator is a phase modulator 2 or a polarization modulator. Preferably, the modulator is a phase modulator 2 configured to perform a phase modulation on the optical signal, so as to generate an optical signal carrier and upper and lower sidebands.

Further, the Fourier domain mode-locked optoelectronic oscillator further includes an optical amplifier configured to amplify the optical signal so as to promote the starting of oscillation. The optical amplifier is disposed between the modulator and the photodetector 4 and integrated onto the optoelectronic chip.

Further, the integrated Fourier domain mode-locked optoelectronic oscillator further includes a latency unit configured to provide a transmission latency for the optical signal so as to improve a quality factor of the optoelectronic oscillator loop. The latency unit is disposed between the modulator and the photodetector 4 and integrated onto the optoelectronic chip; Further, the integrated Fourier domain mode-locked optoelectronic oscillator further includes an optical coupler configured to output the sweeping signal. The optical coupler is disposed between the modulator and the photodetector 4 and integrated onto the optoelectronic chip.

In some embodiments, the laser 1, the modulator, the optical notch filter 3, and the photodetector 4 are integrated together onto an indium phosphide substrate, so as to constitute the optoelectronic chip. The optoelectronic chip with such a construction has advantages such as a simple structure, easy to implement, and a greatly reduced size, weight and power consumption.

In other embodiments, the laser 1 may also be integrated onto an indium phosphide substrate, the phase modulator, the optical notch filter 3, and the photodetector 4 may be integrated onto a silicon-based substrate, and the indium phosphide substrate and the silicon-based substrate constitute the optoelectronic chip by hybrid integration. As a result, the optoelectronic chip combines the advantages of active integration of the indium phosphide substrate and the small size and low loss of the silicon-based substrate together, and the noise of the generated sweeping microwave signal can be reduced.

In other embodiments, the laser 1, the phase modulator and the photodetector 4 may also be integrated together onto an indium phosphide substrate, and the optical notch filter 3 and the latency unit may be integrated together onto a silicon nitride substrate, the indium phosphide substrate and the silicon nitride substrate constitute the optoelectronic chip by hybrid integration.

As a result, the optoelectronic chip combines the advantages of active integration of the indium phosphide substrate and the small size and low loss of the silicon nitride substrate together, and the noise of the generated sweeping microwave signal can be reduced.

Further, the optical notch filter 3 is any one of a phase-shifted Bragg grating, a micro-ring resonator, a Fabry-Perot resonator, and an optical filter based on stimulated Brillouin scattering effect, each of which have a bandwidth as low as several tens of MHz.

Further, as shown in FIG. 1, the optoelectronic oscillator loop has a structure of single loop. However, it can be understood that the optoelectronic oscillator loop can also be implemented in a double-loop or multi-loop manner.

In some embodiments, the optoelectronic chip and the electronic chip are connected with each other by gold wire bonding and fixed on a same thermal conductive base, so that the integrated Fourier domain mode-locked optoelectronic oscillator is easy to assemble and disassemble, and also easy to implement.

According to some embodiments of the present disclosure, there is also provided a communication system including the integrated Fourier domain mode-locked optoelectronic oscillator disclosed by the present disclosure. The integrated Fourier domain mode-locked optoelectronic oscillator is configured as a sweeping microwave signal source. In this way, the communication quality can be greatly improved, and the communication system has a small size, low power consumption and low cost.

The present disclosure will be described in further detail below with reference to the drawings and specific embodiments.

Figure 2:
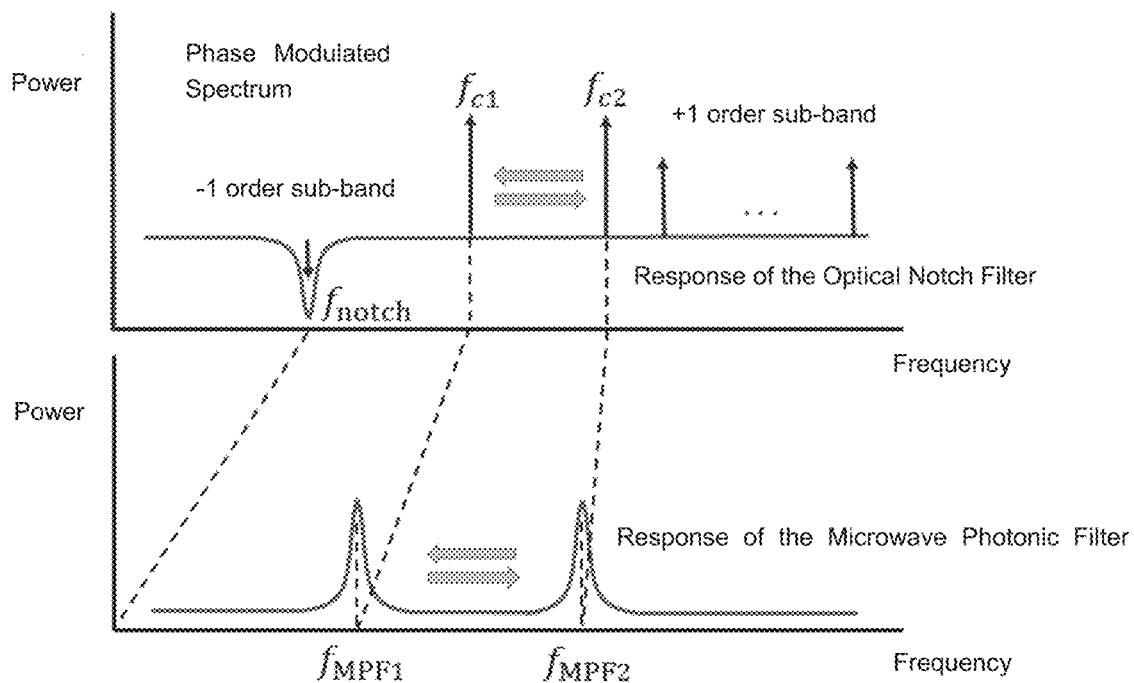
FIG. 2 is a schematic diagram of the working principle of a fast-tuned microwave photonic filter according to an embodiment of the present disclosure.

As shown in FIG. 1, the integrated Fourier domain mode-locked optoelectronic oscillator mainly includes one laser 1, one phase modulator 2, one optical notch filter 3, one photodetector 4, one electrical amplifier 5 and a power splitter 6. The laser 1, the phase modulator 2, the optical notch filter 3, and the photodetector 4 are coupled via an optical waveguide and integrated onto an indium phosphide substrate or a silicon-based substrate. The photodetector 5, the electrical amplifier 6, the power splitter 7, and the phase modulator 2 are coupled via a coplanar microwave waveguide. The electrical amplifier 6 and the power splitter 7 are integrated on the P-type semiconductor substrate so as to form an electronic chip. The optoelectronic chip and the electronic chip are connected with each other by gold wire bonding and fixed on a same thermal conductive base In this embodiment, the integrated Fourier domain mode-locked optoelectronic oscillator operates as follows: the optical signal emitted by the laser 1 is input into the phase modulator 2 so as to be phase modulated. The modulated optical signal includes an optical signal carrier and upper and lower sidebands. It is known from the characteristics of the phase modulation that the beating signals of the optical signal carrier and the two modulation sidebands may cancel each other out, resulting in that the microwave signal cannot be restored in the photodetector 4. If one of the modulation sidebands falls into the optical notch filter 3, it will be suppressed. The beating of the optical signal carrier and the other modulation sideband in the photodetector can restore the microwave signal of a corresponding frequency. This forms an equivalent microwave photonic filter, whose transmission response is bandpass shaped. The center frequency of the microwave photonic filter is equal to a difference between the center frequencies of the optical signal carrier of the laser 1 and the optical notch filter 3. Therefore, by rapidly changing the wavelength of the laser 1 or the notch position of the optical notch filter 3, a rapidly tuned microwave photonic filter can be realized. FIG. 2 is a schematic diagram illustrating the principle to realize a fast-tuning microwave photonic filter by quickly changing the wavelength of the laser when the −1 order sideband is suppressed.

The Fourier domain mode-locking condition is that the tuning period for the fast-tuning microwave photonic filter is synchronized with the time required for a signal to travel in the ring cavity of the optoelectronic oscillator for one trip, that is:

$$nT=T_r;$$

wherein, n is a positive integer, T is a change period of the passband of the microwave photonic filter, and $T_r$ is the latency for delivering a signal in the optoelectronic oscillator loop for one trip.

If the Fourier domain mode-locking condition is satisfied, the filter would be just tuned to the same position when the signal gets back to the microwave photon filter after traveling in the optoelectronic oscillator for one trip. Therefore, microwave signals of different frequencies over the entire sweeping range can oscillate in the cavity at the same time, and the optoelectronic oscillator can generate sweeping microwave signals by self-excited oscillation.

In the sweeping process, microwave signals of different frequencies is not required to go through the process of being established from noise and then stabilizing to a steady state, thus the sweeping speed is very high. The time-frequency variation of the sweeping signal is controlled by the fast tunable microwave photon filter. Thus, the sweeping signal is continuous in phase, which may greatly reduce the noise during the sweeping process. Therefore, it is possible to generate fast chirped sweeping microwave signals with low phase noise and a broad band. The output sweeping signal is tunable, in which the center sweeping frequency and bandwidth can be adjusted by changing the passband of the microwave photonic filter.

In addition, the above definitions for respective elements and methods are not limited to various specific structures, shapes, or modes mentioned in the embodiments, which can be simply replaced by those skilled in the art. For example, the positions of the power splitter 6 and the electrical amplifier 5 may be interchanged. As another example, the phase modulator 2 may be replaced with a polarization modulator. As a further example, an optical amplifier may be added to the optoelectronic chip so as to amplify the optical signal. As a further example, one or more latency units may be added to the optoelectronic chip so as to increase the quality factor of the loop. As a further example, an optical coupler may be added to the optoelectronic chip so as to output the optical sweeping signal. As a further example, respective devices on the optoelectronic chip may be integrated on different substrates or material. As a further example, the optoelectronic oscillator may have a structure of multiple loop, instead of single loop. The number, shapes and sizes of the devices shown in the figures can be modified according to the actual application, and the configurations of the devices may be more complicated.

The purposes, technical solutions and beneficial effects of the present disclosure are further described in detail in connection with the above specific embodiments. It should be understood that the above description is only to illustrate specific embodiments of the present disclosure and is not intended to limit the present disclosure. All the modifications, equivalent replacements, improvements, etc. within the spirit and principle of the present disclosure shall be included in the protection scope of the present disclosure.

We claim:

1. An integrated Fourier domain mode-locked optoelectronic oscillator, comprising an optoelectronic chip and an electronic chip, wherein:
    the optoelectronic chip comprises a laser, a modulator, an optical notch filter, and a photodetector coupled via an optical waveguide, wherein:
        the laser is configured to generate an optical signal;
        the modulator is configured to perform a phase modulation on the optical signal, so as to generate an optical signal carrier and upper and lower sidebands;
        the optical notch filter is configured to filter out one of the sidebands generated by the phase modulation, so as to obtain an equivalent intensity modulated optical signal;
        the photodetector is configured to detect and convert the equivalent intensity modulated optical signal into an electrical signal;
        wherein the laser, the modulator, the optical notch filter, and the photodetector constitute a microwave photonic filter which is based on phase modulation and phase modulation to intensity modulation conversion, and the microwave photonic filter is configured to sweep a passband by changing an emission wavelength of the laser or a filtering position of the optical notch filter periodically; and
    the electronic chip comprises an electrical amplifier and a power splitter coupled via a coplanar microwave waveguide, wherein:
        the electrical amplifier is configured to amplify the electrical signal from the photodetector; and
        the power splitter is configured to split the electrical signal after being amplified into two signals, one being output as a sweeping microwave signal, and the other being fed back to the modulator, forming an optoelectronic oscillator loop,
    wherein a sweeping period for the passband of the microwave photonic filter is matched with a latency for delivering a signal in the optoelectronic oscillator loop for one trip, so that the sweeping microwave signal is generated in the optoelectronic oscillator loop:

$$nT=T_r;$$

wherein, n is a positive integer, T is a change period of the passband of the microwave photonic filter, and $T_r$ is the latency for delivering a signal in the optoelectronic oscillator loop for one trip.

2. The integrated Fourier domain mode-locked optoelectronic oscillator of claim 1, wherein the modulator is a phase modulator or a polarization modulator.

3. The integrated Fourier domain mode-locked optoelectronic oscillator of claim 1, wherein:
    the integrated Fourier domain mode-locked optoelectronic oscillator further comprises an optical amplifier configured to amplify the optical signal so as to promote a starting of oscillation, wherein the optical amplifier is disposed between the modulator and the photodetector and integrated onto the optoelectronic chip;
    the integrated Fourier domain mode-locked optoelectronic oscillator further comprises a latency unit configured to provide a transmission latency for the optical signal so as to improve a quality factor of the optoelectronic oscillator loop, wherein the latency unit is disposed between the modulator and the photodetector and integrated onto the optoelectronic chip; and
    the integrated Fourier domain mode-locked optoelectronic oscillator further comprises an optical coupler configured to output an optical sweeping signal, wherein the optical coupler is disposed between the modulator and the photodetector and integrated onto the optoelectronic chip.

4. The integrated Fourier domain mode-locked optoelectronic oscillator of claim 3, wherein:
    the laser, the modulator, the optical notch filter, the latency unit and the photodetector are integrated together onto an indium phosphide substrate, so as to constitute the optoelectronic chip; or
    the laser is integrated onto the indium phosphide substrate, a phase modulator, the optical notch filter, the latency unit and the photodetector are integrated onto a silicon-based substrate, and the indium phosphide substrate and the silicon-based substrate constitute the optoelectronic chip by hybrid integration; or
    the laser, the phase modulator and the photodetector are integrated together onto the indium phosphide substrate, and the optical notch filter and the latency unit are integrated together onto a silicon nitride substrate, the indium phosphide substrate and the silicon nitride substrate constitute the optoelectronic chip by hybrid integration.

5. The integrated Fourier domain mode-locked optoelectronic oscillator of claim 1, wherein the optical notch filter is any one of a phase-shifted Bragg grating, a micro-ring resonator, a Fabry-Perot resonator, and an optical filter based on stimulated Brillouin scattering effect, each of which has a bandwidth as low as several tens of MHz.

6. The integrated Fourier domain mode-locked optoelectronic oscillator of claim 1, wherein the optoelectronic oscillator loop have a structure of single loop, double-loop, and multi-loop.

7. The integrated Fourier domain mode-locked optoelectronic oscillator of claim 1, wherein the optoelectronic chip and the electronic chip are connected with each other by gold wire bonding and fixed on a same thermal conductive base.

8. The integrated Fourier domain mode-locked optoelectronic oscillator of claim 1, wherein the integrated Fourier domain mode-locked optoelectronic oscillator is applied in a radar or communication system.

9. A communication system comprising the integrated Fourier domain mode-locked optoelectronic oscillator of claim 1, wherein the integrated Fourier domain mode-locked optoelectronic oscillator is configured as a sweeping microwave signal source.

10. The integrated Fourier domain mode-locked optoelectronic oscillator of claim 3, wherein the integrated Fourier domain mode-locked optoelectronic oscillator is applied in a radar or communication system.

11. A communication system comprising the integrated Fourier domain mode-locked optoelectronic oscillator of claim 3, wherein the integrated Fourier domain mode-locked optoelectronic oscillator is configured as a sweeping microwave signal source.

12. The integrated Fourier domain mode-locked optoelectronic oscillator of claim 4, wherein the integrated Fourier domain mode-locked optoelectronic oscillator is applied in a radar or communication system.

13. A communication system comprising the integrated Fourier domain mode-locked optoelectronic oscillator of claim 4, wherein the integrated Fourier domain mode-locked optoelectronic oscillator is configured as a sweeping microwave signal source.

* * * * *